United States Patent
Chang et al.

(10) Patent No.: US 10,277,302 B2
(45) Date of Patent: Apr. 30, 2019

(54) SIGNAL-REPEATING DEVICE FOR EXTENDING A CONTROL AREA AND SIGNAL-REPEATING METHOD THEREOF

(71) Applicant: Coiler Corporation, New Taipei (TW)

(72) Inventors: Yu-Huei Chang, New Taipei (TW); Po-Jen Chen, New Taipei (TW)

(73) Assignee: COILER CORPORATION, New Taipei (TW)

( * ) Notice: Subject to any disclaimer, the term of this patent is extended or adjusted under 35 U.S.C. 154(b) by 24 days.

(21) Appl. No.: 15/596,654

(22) Filed: May 16, 2017

(65) Prior Publication Data

US 2017/0346548 A1 Nov. 30, 2017

(30) Foreign Application Priority Data

May 26, 2016 (TW) .............................. 105116493 A

(51) Int. Cl.
*H04B 7/15* (2006.01)
*H04B 7/155* (2006.01)
(Continued)

(52) U.S. Cl.
CPC ......... *H04B 7/15507* (2013.01); *H04B 7/155* (2013.01); *H04B 7/15528* (2013.01);
(Continued)

(58) Field of Classification Search
CPC ......... H04B 7/15507; H04W 4/80; H04L 5/14
See application file for complete search history.

(56) References Cited

U.S. PATENT DOCUMENTS 6,718,160 B2 4/2004 Schmutz
2006/0205342 A1 9/2006 McKay, Sr. et al.
(Continued)

FOREIGN PATENT DOCUMENTS

CA 2687784 A1 11/2008
CN 102394687 A * 3/2012
(Continued)

OTHER PUBLICATIONS

An Office Action from corresponding TW Application No. 105116493 dated May 24, 2017; 7 pgs.

*Primary Examiner* — Dong-Chang Shiue
(74) *Attorney, Agent, or Firm* — Muncy, Geissler, Olds & Lowe, P.C.

(57) ABSTRACT

A signal-repeating device for extending a control area and signal-repeating method thereof are provided. The signal-repeating device includes a first connection port, a second connection port, a repeating circuit, a communication-monitoring module and a processing unit. The first connection port is coupled to a first antenna. The first antenna supports a first frequency band and a second frequency band. The second connection port is coupled to a second antenna. The repeating circuit is coupled between the first connection port and the second connection port to repeat signals between a base station and a mobile station via the first antenna and the second antenna through the first frequency band. The communication-monitoring module is connected to a user terminal via the first antenna through the second frequency band. The processing unit is coupled to the repeating circuit and the communication-monitoring module. The first frequency band does not overlap the second frequency band.

20 Claims, 4 Drawing Sheets

(51) Int. Cl.
*H04W 4/80* (2018.01)
*H04L 5/14* (2006.01)
*H04W 24/08* (2009.01)

(52) U.S. Cl.
CPC ............... *H04L 5/14* (2013.01); *H04W 4/80* (2018.02); *H04W 24/08* (2013.01)

(56) References Cited

U.S. PATENT DOCUMENTS

| 2011/0188413 | A1 | 8/2011 | Kuo et al. | |
| 2011/0281579 | A1* | 11/2011 | Kummetz | H04B 7/15535 |
| | | | | 455/424 |
| 2013/0150125 | A1* | 6/2013 | Tseng | H04W 88/02 |
| | | | | 455/557 |
| 2016/0269132 | A1* | 9/2016 | Clark | H04W 16/28 |

FOREIGN PATENT DOCUMENTS

| CN | 202759450 U | 2/2013 |
| CN | 204993345 U | 1/2016 |
| KR | 20150133367 A * | 11/2015 |
| WO | 0079821 A1 | 12/2000 |

\* cited by examiner

SIGNAL-REPEATING DEVICE FOR EXTENDING A CONTROL AREA AND SIGNAL-REPEATING METHOD THEREOF

CROSS-REFERENCE TO RELATED APPLICATION

This non-provisional application claims priority under 35 U.S.C. § 119(a) to Patent Application No. 105116493 filed in Taiwan, R.O.C. on May 26, 2016, the entire contents of which are hereby incorporated by reference.

BACKGROUND

Related Field

The instant disclosure relates to a signal-repeating device and method thereof, in particular, to a signal-repeating device and signal-repeating method in a mobile communication system adapted to extend its control area.

Related Art

In a mobile communication system, a repeater is installed between a base station and mobile station(s). A repeater is basically an apparatus to amplify and transmit a mobile network signal (namely a radio-frequency signal) without any time delay. In a downlink, a repeater receives signals transmitted from the base station, amplifies the received signals and repeats the amplified signals to be received by a mobile communication device of the mobile station. In an uplink, a repeater operates in the opposite way, so that signals are transmitted from the mobile communication device, the repeater to the base station. In other words, a repeater may be utilized to extend the covering range and capacity of a mobile network.

On the other hand, during the installation or maintenance processes repeater, maintenance engineers may apply a wired or wireless connection to a repeater with an electrical device, so as to review or control the operation of the repeater. However, in the prior art, no matter the control connection with the repeater is established on a wired or wireless connection, both the engineer and his electrical device must locate in a close range to the repeater (about 5-10 feet). If the repeater is located at an area difficult to access or under restrict surveillance, such as a mezzanine under a roof, a tunnel or a central control room, the engineer's selectivity for installation and alarm resolution would be very limited, which extends working hours and causes troubles to the clients.

SUMMARY

In an embodiment of the instant disclosure, a signal-repeating device for extending a control area includes a first connection port, a second connection port, a repeating circuit, a communication-monitoring module and a processing unit. The first connection port, coupled to a first antenna, supports a first frequency band and a second frequency band. The second connection port is coupled to a second antenna. The repeating circuit is coupled between the first connection port and the second connection port to repeat signals between a base station and a mobile station via the first antenna and the second antenna through the first frequency band. The communication-monitoring module is connected to a user terminal via the first antenna through the second frequency band. The processing unit is coupled to the repeating circuit and the communication-monitoring module. The first frequency band and the second frequency band are non-overlapping with each other.

In another embodiment, a signal-repeating method for extending a control area includes the following steps. First, receive radio-frequency signal through a first antenna. Next, send a first signal with a first frequency band included in the radio-frequency signal to a repeating circuit. Then, send a second signal with a second frequency band in the radio-frequency signal to a communication-monitoring module. Afterwards, repeat the first signal by the repeating circuit via the second antenna. Next, output a control signal by the communication-monitoring module according to the second signal. In addition, control the repeating circuit by a processing unit according to the control signal.

In another embodiment, a signal-repeating method for extending a control area includes the following steps. First, repeat a first signal with a first frequency band between a base station and a mobile station by a repeating circuit through a first antenna. Next, receive a second signal with a second frequency band by a communication-monitoring module and through the first antenna. Then, output a control signal by the communication-monitoring module according to the second signal. In addition, control the repeating circuit by a processing unit according to the control signal. The first frequency band and the second frequency band are non-overlapping with each other.

In brief, the signal-repeating device and signal-repeating method according to the embodiments of the instant disclosure, facilitates the possibility for a communication-monitoring module and a repeating circuit to share a base station's antenna and/or a mobile station's antenna, thereby extending the control area thereof. Accordingly, maintenance engineers or users do not need to stay in a close range to the repeater hardware for inspecting the repeater's operating statuses or control its operation settings. Therefore, the conveniences of installing and maintaining the repeater are effectively increased, as well as increasing the safety of maintenance engineers and omitting the complexity of applying for visiting a restrict location.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
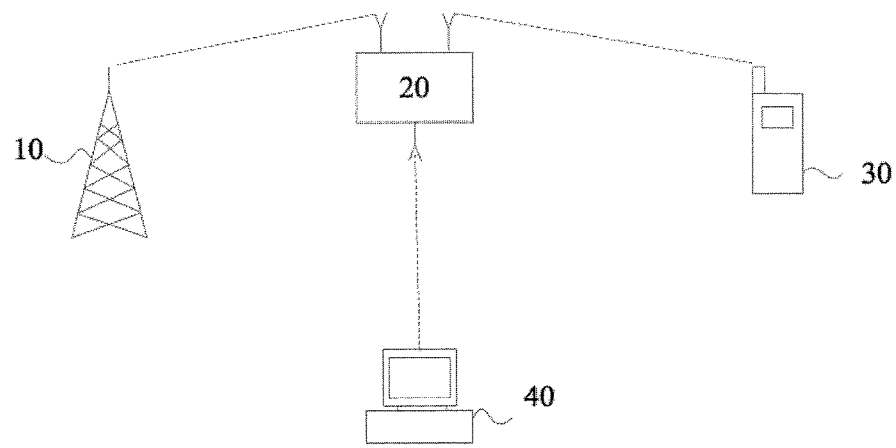
FIG. 1 illustrates an explanatory diagram of a mobile communication system according to an embodiment.

FIG. 1 illustrates an explanatory diagram of a mobile communication system according to an embodiment.

Please refer to FIG. 1. A mobile communication system includes a base station 10, a signal-repeating device 20 and a mobile station 30. In some embodiments, the signal-repeating device 20 may be, for example a repeater, which is not limited herein.

The mobile station 30 and the base station 10 may conduct bidirectional communications through the signal-repeating device 20. In detail, in uplink transmission, the signal-repeating device 20 repeats the radio-frequency signals sent by the mobile station 30 to the base station 10. In downlink transmission, the signal-repeating device 20 operates in the opposite way to repeat the radio-frequency signals sent by base station 10 to the mobile station 30.

As shown in FIG. 1, the signal-repeating device 20 is connected to a user terminal 40, so that the signal-repeating device 20 may be controlled by the user terminal 40. In other words, the signal-repeating device 20 has a repeating function and a control function. In the repeating function, the signal-repeating device 20 repeats signals between the base station 10 and the mobile station 30. In the control function, the signal-repeating device 20 transmits its configurations or the quality of repeated signals to the user terminal 40, and to be displayed on the user terminal 40; while the user terminal 40 may control the configurations of the signal-repeating device 20. Namely, the user terminal 40 produces and transmits control signals (radio-frequency signals) to the signal-repeating device 20, so that the signal-repeating device 20 modifies its settings according to the received control signals.

In some embodiments, the user terminal 40 may be a computer, mobile phone, tablet computer, personal mobile assistant or any other electrical apparatus with mobile communication functions.

Figure 2:
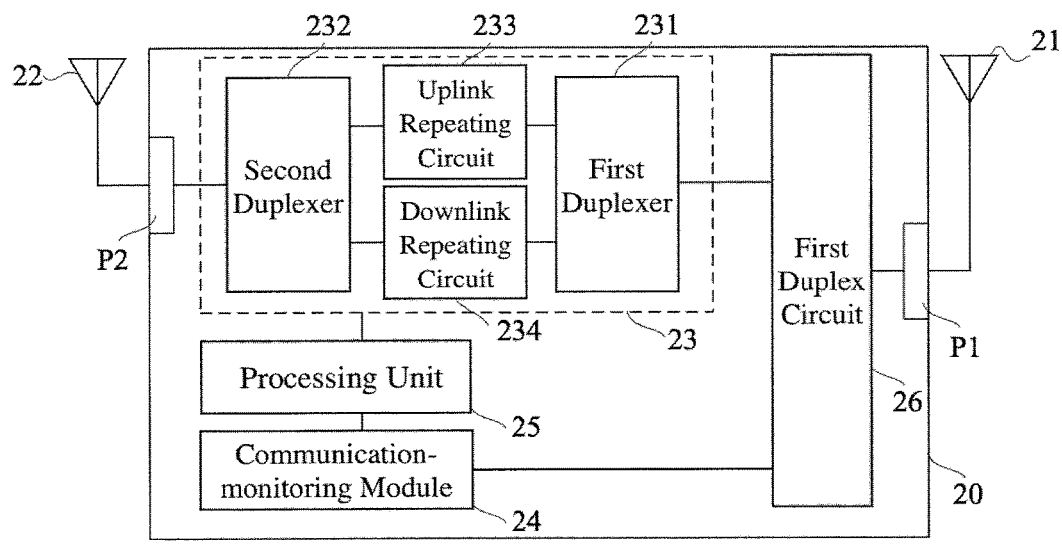
FIG. 2 illustrates a block diagram of a signal-repeating device for extending a control area according to a first embodiment of the instant disclosure.

FIG. 2 illustrates a block diagram of a signal-repeating device for extending a control area according to a first embodiment of the instant disclosure. Please refer to FIG. 2. The signal-repeating device 20 includes two connection ports (hereinafter first connection port P1 and second connection port P2), a repeating circuit 23, a communication-monitoring module 24 and a processing unit 25. The repeating circuit 23 is coupled between the first connection port P1 and the second connection port P2. The processing unit 25 is coupled to the repeating circuit 23 and the communication-monitoring module 24. The first connection port P1 is configured to install an antenna (hereinafter first antenna 21); namely the first connection port P1 is coupled to the first antenna 21. The second connection port P2 is configured to install another antenna (herein after second antenna 22); namely, the second connection port P2 is coupled to the second antenna 22.

Please refer to FIG. 1 and FIG. 2. The repeating circuit 23 is connected to the base station 10 through the second connection port P2 and the second antenna 22; also the repeating circuit 23 is connected to the mobile station 30 via the first connection port P1 and the first antenna 21 through a first frequency band. Thus, the repeating circuit 23 may repeat radio-frequency signals between the base station 10 and the mobile station 30. Aside from supporting the first frequency band, the first antenna 21 also supports a second frequency band. The communication-monitoring module 24 is connected to the user terminal 40 via the first antenna 21 through the second frequency band. Herein the repeating circuit 23 and the communication-monitoring module 24 share the antenna (namely first antenna 21) that repeating circuit 23 utilizes to connect with the mobile station 30.

In uplink transmission of the repeating function, The first antenna 21 is utilized as a receiving antenna, while the second antenna 22 is utilized as a transmitting antenna. The first antenna 21 receives the radio-frequency signals (hereinafter first uplink signals) from the mobile station 30 through first frequency band. In other words, the first uplink signal includes the first frequency band. The repeating circuit 23 processes the first uplink signal by remaining the same signal nature (for example, reproducing, filtering, amplifying, controlling the output power level or any combination of signal processing thereof) and repeat the processed first uplink signal to the base station 10 via the second antenna 22.

In downlink transmission of the repeating function, the first antenna 21 is utilized as a transmitting antenna, while the second antenna 22 is utilized as a receiving antenna. The second antenna 22 receives the radio-frequency signals from the base station 10 (hereinafter first downlink signal). In other words, the first downlink signal includes the first frequency band. The repeating circuit 23 processes the first downlink signal by remaining the same signal nature, and repeats the processed first downlink signal to the mobile station 30 via the first antenna 21 through the first frequency band.

Therefore, the first antenna 21, the repeating circuit 23 and the second antenna 22 may be practically utilized as a general repeater for repeating the radio-frequency signals of mobile communication technology between the mobile station 30 and the base station 10.

In the control function, the first antenna 21 transmits the radio-frequency signals (hereinafter status signals) to the user terminal 40, in which the status signals represent the configurations of the signal-repeating device 20 or the signal quality data thereof. The first antenna 21 may also receive the radio-frequency signal(s) (hereinafter second signals) sent back from the user terminal 40 and transmit to the communication-monitoring module 24. In other words, the communication-monitoring module 24 receives the second signal with the second frequency band from the user terminal 40 via the first antenna 21, and outputs control signals to the processing unit 25 according to the second signals, thereby instructing the processing unit 25 to modify the configurations of the signal-repeating device 20 or the signal quality.

Herein the second frequency band and the first frequency band are non-overlapping with each other. For example, assume the base station 10 and the mobile station 30 are connected with the first antenna 21 under the long-range wireless communication technologies such as the second-generation mobile communication technology (2G) or the third generation mobile communication technology (3G). On the other hand, the second frequency band may be the 2.4 GHz frequency band for short-range wireless communication technologies such as Bluetooth communication technology or Wi-Fi communication technology. In other words, the communication-monitoring module 24 may be a short-range wireless communication module such as a Bluetooth module or a Wi-Fi module.

Accordingly, the communication-monitoring module 24 and the repeating circuit 23 may share the first antenna 21 to extend a control area with the second frequency band.

Therefore, maintenance engineers or users do not need to stay in a close range to the location of the repeater hardware for on-site inspecting the operation statuses or controlling the operation settings thereof.

In some embodiments, when the user terminal 40 receives the status signals of the signal-repeating device 20, the user terminal 40 displays plural parameter setting windows according to the received status signals, in which the parameter setting windows may include setting items such as Control, Monitor, Alarm or any combination thereof for the user of the user terminal 40 to configure the settings of the signal-repeating device 20. Next, after the user finishes setting items in the parameter setting windows, the user terminal 40 products and sends the second signals back to the signal-repeating device 20 accordingly to configure the processing unit 25.

The aforesaid setting items may include Downlink PA (Power Amplifier), Uplink PA, DL AGC (Downlink Auto Gain Control), UL AGC (Uplink Auto Gain Control), DL (Downlink) Center Frequency, UL (Uplink) Center Frequency, DL ATT (Downlink Attenuation), UL ATT (Uplink Attenuation), AGS Restart (Auto Gain Control Restart), DL ASD (Downlink Auto Shutdown), UL ASD (Uplink Auto Shutdown), AGS (Auto Gain Setting) and Isolation Level Check or any combination thereof. The monitoring items may include Temperature, LAC/TAC (Location Area Code/Tracking Area Code), Base Station Cell ID, DL Gain, UL Gain, DL Input Power, UL Input Power, DL Output Power, UL Output Power), DL Gain, UL Gain, PSC (Primary Scrambling Code), PCI (Physical Layer Cell Identity), RSCP (Received Signal Code Power), RSRP (Reference Signal Receiving Power), SINR (Signal to Interference plus Noise Ratio), Isolation Level and Modem Signal or any combination thereof. Alarm items may include UL PA Alarm, DL PA Alarm, UL PLL Alarm (UL Phase Loop Lock Alarm), DL PLL Alarm, Over Temp Alarm, Door Open Alarm, UL Isolation Alarm, DL Isolation Alarm, UL Over Power Alarm and DL Over Power Alarm or any combination thereof.

In some embodiments, as shown in FIG. 2, a duplex circuit (hereinafter first duplex circuit 26) is configured between the first antenna 21 (first connection port P1) and the repeating circuit 23, and between the first antenna 21 (first connection port P1) and the communication-monitoring module 24. A first end of the first duplex circuit 26 is coupled to the first antenna 21 via the first connection port P1, and a second end of the first duplex circuit 26 is coupled to the repeating circuit 23, while a third end of the first duplex circuit 26 is coupled to the communication-monitoring module 24. Herein, when the first antenna 21 is utilized as a transmitting antenna, the first duplex circuit 26 couples the first downlink signal processed by the repeating circuit 23 and the status signal from the communication-monitoring module 24 into a coupling signal (radio-frequency signal) to be transmitted by the first antenna 21. When the first antenna 21 is utilized as a receiving antenna, the first duplex circuit 26 provides the first signal with the first frequency band, which is included in the radio-frequency signal from the mobile station 30, to the repeating circuit 23 via the first antenna 21; also the second signal with the second frequency band, which is included in the radio-frequency signal from the user terminal 40, is provided to the communication-monitoring module 24 via the first antenna 21.

In some embodiments, the first duplex circuit 26 may be realized by a coupler or a duplexer.

Figure 3:
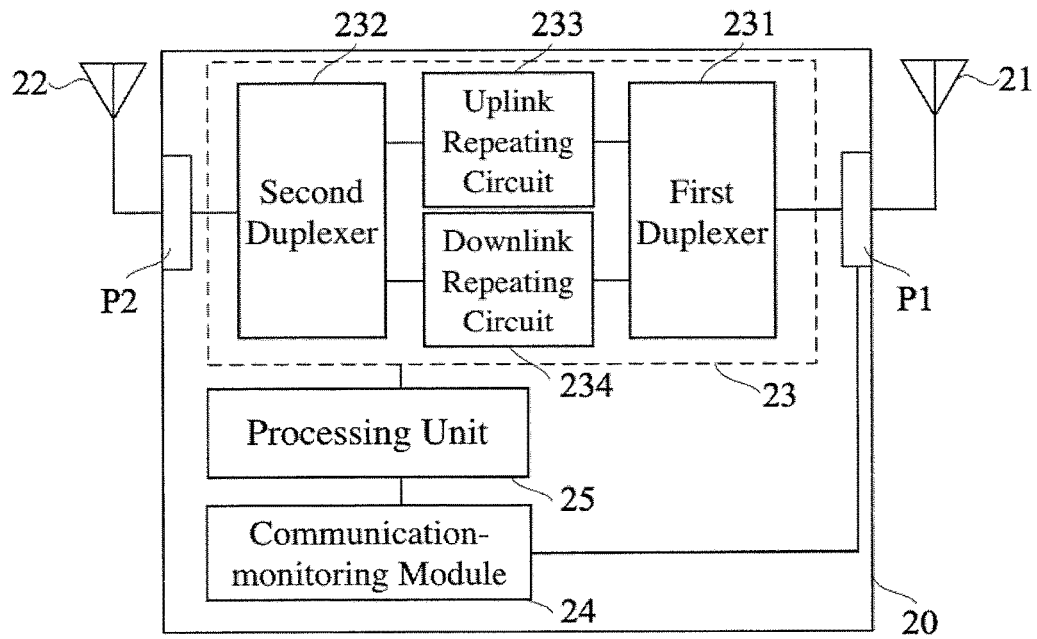
FIG. 3 illustrates a block diagram of another example of the signal-repeating device according to the first embodiment of the instant disclosure.

In some embodiments, the repeating circuit 23 and the communication-monitoring module 24 may be coupled with the first connection port P1 (first antenna 21) directly by circuit layout. FIG. 3 illustrates a block diagram of another example of the signal-repeating device according to the first embodiment of the instant disclosure. As shown in FIG. 3, the radio-frequency signal received by the first antenna 21 is directly sent to the repeating circuit 23 and the communication-monitoring module 24, and then the repeating circuit 23 and the communication-monitoring module 24 respectively retrieves the supported signal from the radio-frequency signal. In other words, the repeating circuit 23 retrieves the first signal with first frequency band included in the radio-frequency signal for the subsequent repeating process, while the communication-monitoring module 24 retrieves the second signal with the second frequency band included in the radio-frequency signal for outputting the control signal accordingly.

In some embodiments, the repeating circuit 23 includes two duplexers (hereinafter first duplexer 231 and second duplexer 232), an uplink repeating circuit 233 and a downlink repeating circuit 234. The first duplexer 231 is coupled to the first duplex circuit 26, and also coupled to the first antenna 21 via the first duplex circuit 26. The uplink repeating circuit 233 is coupled between the first duplexer 231 and the second duplexer 232, while the downlink repeating circuit 234 is coupled between the first duplexer 231 and the second duplexer 232. The second duplexer 232 is coupled to the second antenna 22 through the second connection port P2.

In some embodiments, the first duplex circuit 26 and the first duplexer 231 may be realized by a multiplexer.

Figure 4:
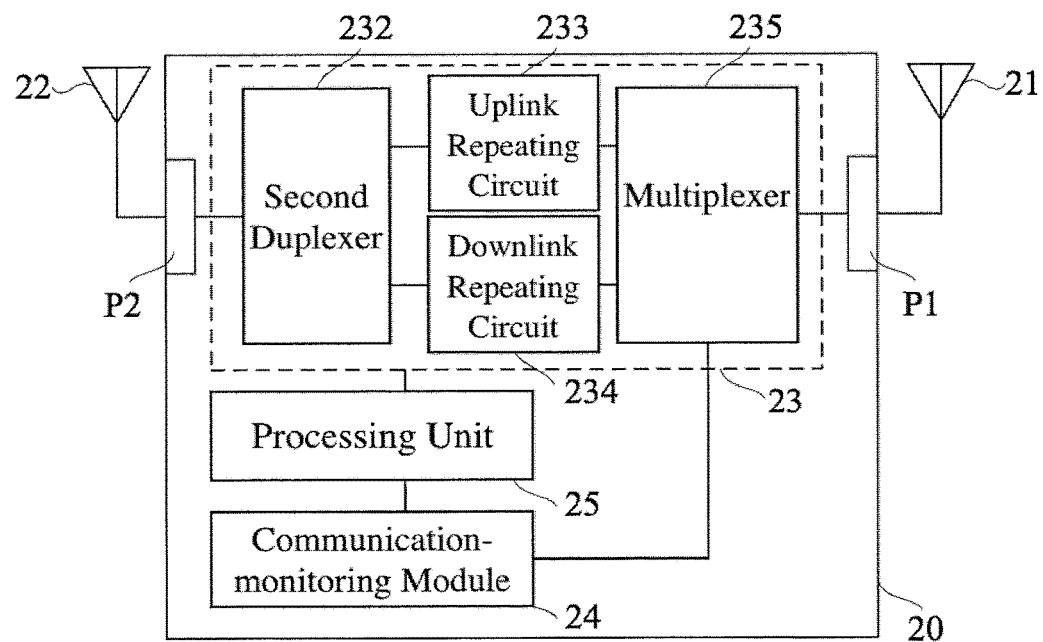
FIG. 4 illustrates a block diagram of another example of the signal-repeating device according to the first embodiment of the instant disclosure.

FIG. 4 illustrates a block diagram of another example of the signal-repeating device according to the first embodiment of the instant disclosure. Please refer to FIG. 4. The repeating circuit 23 includes a multiplexer 235. The multiplexer 235 is coupled to the first antenna 21 via the first connection port P1. The uplink repeating circuit 233 is coupled between the second duplexer 232 and the multiplexer 235. The downlink repeating circuit 234 is coupled between the second duplexer 232 and the multiplexer 235. The communication-monitoring module 24 is coupled to the multiplexer 235. Herein, through the interconnection of the multiplexer 235, the first antenna 21 is coupled to the uplink repeating circuit 233, the downlink repeating circuit 234 and the communication-monitoring module 24.

In the uplink transmission of the repeating function, the first uplink signal received via the first antenna 21 is sent via the multiplexer 235 to uplink repeating circuit 233 for signal processing. In the downlink transmission, the processed second radio-frequency signal is sent via the multiplexer 235 to the first antenna 21 for repeating to the mobile station 30. In the control function, the user terminal 40 may be connected to the communication-monitoring module 24 through the coupling between the first antenna 21 and the multiplexer 235.

Figure 5:
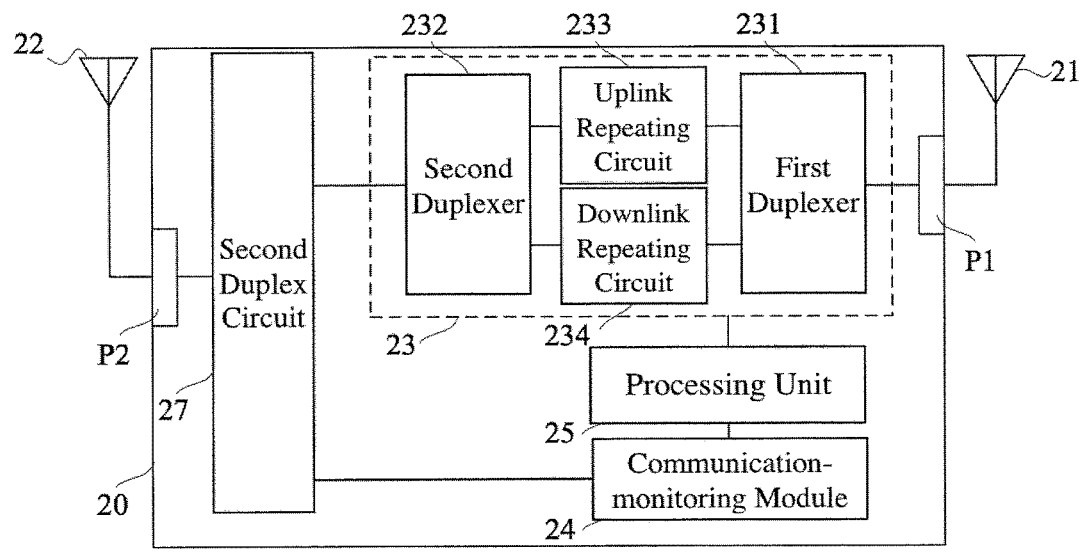
FIG. 5 illustrates a block diagram of a signal-repeating device for extending a control area according to a second embodiment of the instant disclosure.
Figure 6:
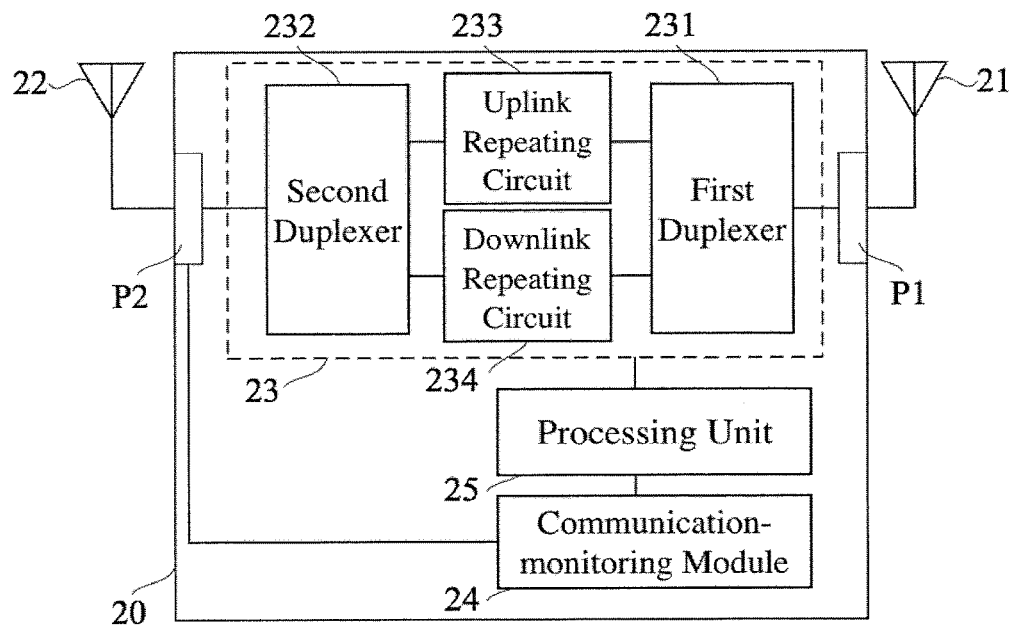
FIG. 6 illustrates a block diagram of another example of the signal-repeating device according to the second embodiment of the instant disclosure.
Figure 7:
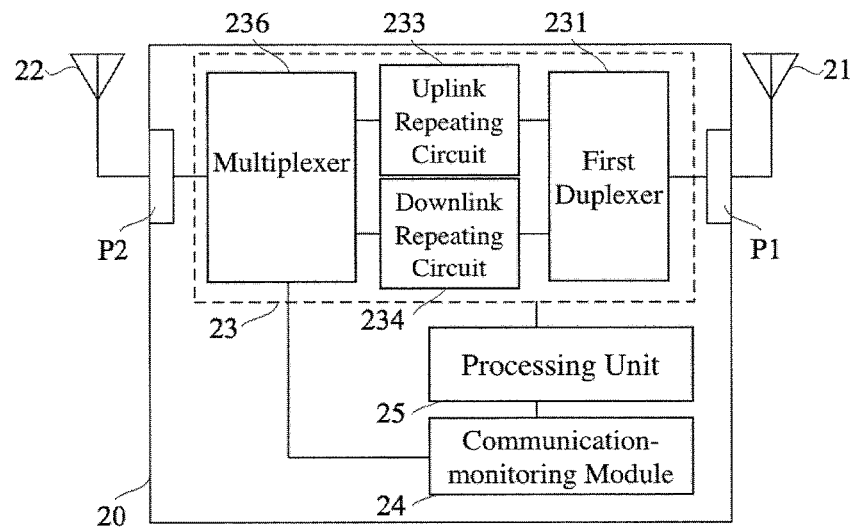
FIG. 7 illustrates a block diagram of another example of the signal-repeating device according to the second embodiment of the instant disclosure.

FIG. 5 illustrates a block diagram of a signal-repeating device for extending a control area according to a second embodiment of the instant disclosure. FIG. 6 and FIG. 7 respectively illustrate a block diagram of another example of the signal-repeating device according to the second embodiment of the instant disclosure. Please jointly refer to FIG. 5, FIG. 6 and FIG. 7. In these embodiments, the communication-monitoring module 24 is adapted to be coupled to the antenna (namely, the second antenna 22) shared with the repeating circuit 23 for the wireless connection to the base station 10. Herein, the second antenna 22 supports the second frequency band, and the communication-monitoring module 24 is coupled between the second antenna 22 and the processing unit 25. In the control function, the communication-monitoring module 24 transmits the status signal via the second antenna 22 to the user terminal 40. In addition, the communication-monitoring module 24 receives the second signal transmitted from the user terminal 40 via the second antenna 22. In the repeating function, the operations of the first antenna 21, the repeating circuit 23 and the second antenna 22 are similar to the aforesaid embodiments, and the relative descriptions are not repeated herein.

As shown in FIG. 5, a duplex circuit (hereinafter second duplex circuit 27) is coupled between the second antenna 22 and the repeating circuit 23, and between the second antenna 22 and the communication-monitoring module 24. A first end of the second duplex circuit 27 is coupled to the second antenna 22 via the second connection port P2; a second end of the second duplex circuit 27 is coupled to the repeating circuit 23; and a third end of the second duplex circuit 27 is coupled to the communication-monitoring module 24.

When the second antenna 22 is utilized as a transmission antenna, the second duplex circuit 27 couples the processed first uplink signal from the repeating circuit 23 and the status signal from the communication-monitoring module 24 into a coupling signal (radio-frequency signal), and provides to the second antenna 22 for transmission. When the second antenna 22 is utilized as a receiving antenna, the second duplex circuit 27 receives the first signal with the first frequency band included in the received radio-frequency signal from the base station 10 via the second antenna 22, and provides to the repeating circuit 23. In addition, the second duplex circuit 27 receives the second signal with the second frequency band included in the received radio-frequency signal from the user terminal 40 via the second antenna 22, and provides to the communication-monitoring module 24.

In some embodiments, the second duplex circuit 27 may be realized by a coupler or a duplexer.

In some other embodiments, the repeating circuit 23 and the communication-monitoring module 24 may be coupled to the second connection port P2 (the second antenna 22) by circuit layout. As shown in FIG. 6, the radio-frequency signal received via the second antenna 22 is directly sent to the repeating circuit 23 and the communication-monitoring module 24, and then the repeating circuit 23 and the communication-monitoring module 24 respectively retrieve the supported signal thereof from the radio-frequency signal. In other words, the repeating circuit 23 retrieves the first signal with the first frequency band in the received radio-frequency signal for the subsequent repeating process, while the communication-monitoring module 24 retrieves the second signal with the second frequency band in the received radio-frequency signal for outputting the control signal accordingly.

In the second embodiment, the second duplexer 232 and the second duplex circuit 27 may be realized by multiplexers. As shown in FIG. 7, the repeating circuit 23 includes a multiplexer 236. The multiplexer 236 is coupled to the second antenna 22 via the second connection port P2. The uplink repeating circuit 233 is coupled between the first duplexer 231 and the multiplexer 236. The downlink repeating circuit 234 is coupled between the first duplexer 231 and the multiplexer 236. The communication-monitoring module 24 is coupled to the multiplexer 236. Herein, through the interconnection of the multiplexer 236, the second antenna 22 is coupled to the uplink repeating circuit 233, the downlink repeating circuit 234 and the communication-monitoring module 24.

In uplink transmission of the repeating function, the first uplink signal processed by the uplink repeating circuit 233 is sent via the multiplexer 236 and repeated through the second antenna 22 to the base station 10. In downlink transmission, the first downlink signal received via the second antenna 22 is sent through the multiplexer 236 to the downlink repeating circuit 234 for signal processing. In the control function, the user terminal 40 may connect to the communication-monitoring module 24 via the coupling of the second antenna 22 and the multiplexer 236.

Figure 8:
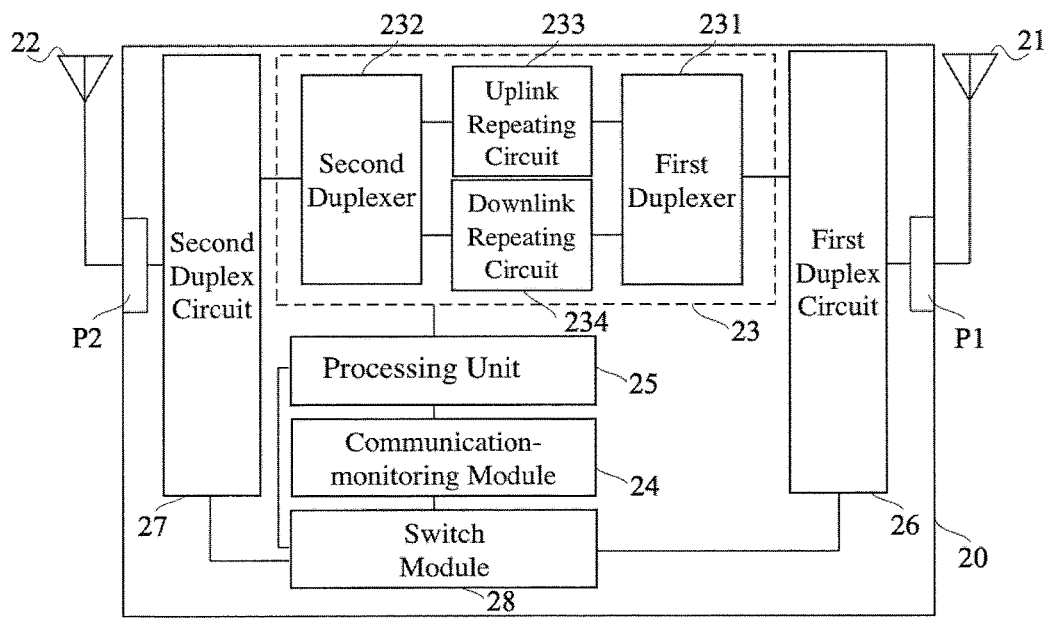
FIG. 8 illustrates a block diagram of a signal-repeating device for extending a control area according to a third embodiment of the instant disclosure.

FIG. 8 illustrates a block diagram of a signal-repeating device for extending a control area according to a third embodiment of the instant disclosure. Please refer to FIG. 8. Please refer to FIG. 8. Herein, the communication-monitoring module 24 and the repeating circuit 23 share the antenna (namely first antenna 21) that repeating circuit 23 utilizes to connect with the mobile station 30. In the mean time, the communication-monitoring module 24 and the repeating circuit 23 share the antenna (namely, second antenna 22) that the repeating circuit 23 utilizes to connect with the base station 10; wherein the first antenna 21 and the second antenna 22 both support the second frequency band, namely each of the first antenna 21 and the second antenna 22 may transmit the status signal and receive the second signal. In the control function, the communication-monitoring module 24 may selectively be coupled to the first antenna 21 and the second antenna 22 to communicate with the user terminal 40.

As shown in FIG. 8, the signal-repeating device 20 further includes a switch module 28, which is configured to install between the communication-monitoring module 24 and the first antenna 21, and between the communication-monitoring module 24 and the second antenna 22. A first end of the switch module 28 is coupled to the communication-monitoring module 24; a second end of the switch module 28 is coupled to the first duplex circuit 26; and a third end of the switch module 28 is coupled to the second duplex circuit 27. In addition, a control end of the switch module 28 is coupled to the processing unit 25. According to a switch signal from the processing unit 25, the switch module 28 couples the communication-monitoring module 24 to one of the first antenna 21 (the first duplex circuit 26) and the second antenna 22 (the second duplex circuit 27).

In the control function, when the switch module 28 couples the communication-monitoring module 24 to the first antenna 21, the status signal is sent from the communication-monitoring module 24, through the switch module 28 and the first duplex circuit 26, via the first antenna 21 to user terminal 40; while the second signal from the user terminal 40 is sent via the first antenna 21, the first duplex circuit 26 and the switch module 28 to the communication-monitoring module 24. In some embodiments, under the circumstances mentioned above, the communication-monitoring module 24 may not be connected to the second duplex circuit 27, which means the radio-frequency signal received by the second antenna 22 is not sent to the communication-monitoring module 24.

On the other hand, in the control function, when the switch module 28 couples the communication-monitoring module 24 to the second antenna 22, the status signal is sent from the communication-monitoring module 24, through the switch module 28 and the second duplex circuit 27, via the second antenna 22 to the user terminal 40; while the second signal from the user terminal 40 is sent via the second antenna 22, through the second duplex circuit 27 and the switch module 28 to the communication-monitoring module 24. In some embodiments, under the circumstances mentioned above, the communication-monitoring module 24 may not be connected to the first duplex circuit 26, which means the radio-frequency signal received from the first antenna 21 is not sent to the communication-monitoring module 24.

In some embodiments, the switch module 28 may be realized by a signal switch or signal splitter.

In some other embodiments, the first duplex circuit 26 and the first duplexer 231 may be realized by multiplexer 235, while the second duplexer 232 and the second duplex circuit 27 may be realized by another multiplexer 236. The operations of the multiplexers 235, 236 are disclosed with detailed descriptions in the former paragraphs, and are not repeated herein.

In some embodiments, each of the uplink repeating circuit 233 and the downlink repeating circuit 234 includes a low noise amplifier (LNA), a power amplifier (PA), and a filtering circuit with one or more filters. For example, when the uplink repeating circuit 233 includes a low noise amplifier, a filtering circuit and a power amplifier, in different embodiments, the low noise amplifier, the filtering circuit and the power amplifier of the uplink repeating circuit 233 may be electrically connected, in sequence, between the first duplexer 231 and the second duplexer 232, or between the multiplexer 235 and the second duplexer 232, or between the multiplexer 235 and the multiplexer 236, to conduct signal processing for the first uplink signal. The processing unit 25 is coupled to one of the low noise amplifier, the filtering circuit and the power amplifier, thereby controlling the parameters of the coupled elements and/or monitoring the quality of the signals processed by the coupled elements. For example, when the downlink repeating circuit 234 includes a low noise amplifier, a filtering circuit and a power amplifier, in different embodiments, the low noise amplifier, the filtering circuit and the power amplifier of the downlink repeating circuit 234 may be electrically connected, in sequence, between the first duplexer 231 and the second duplexer 232, or between the multiplexer 235 and the second duplexer 232, or between the multiplexer 235 and the multiplexer 236, to conduct signal processing for the first downlink signal. The processing unit 25 is coupled to one of the low noise amplifier, the filtering circuit and the power amplifier, thereby controlling the parameters of the coupled elements and/or monitoring the quality of the signals processed by the coupled elements.

In some embodiments, the processing unit 25 may be realized a central processing unit, a microcontroller or Application-specific IC (ASIC). In addition, the processing unit 25 may, by means of firmware or software according to a control signal, control the repeating circuit 23, such as setting up the parameters of the repeating circuit 23.

For the person having ordinary skills in the art, it is clear to understand that the aforesaid numbers such as "first" and "second" are to differentiae from components with the same names, which are not utilized to indicate particular elements and have no meanings of a certain sequence. For instance, although the antenna and connection port connected to the mobile station 30 above are called the first antenna and the first connection port, and the antenna and port connected to the base station 10 above are called the second antenna and the second connection port, the numbers can be utilized in the opposite way; such as, the antenna and connection port connected to the mobile station 30 may be called the second antenna and the second connection port, and the antenna and port connected to the base station 10 may be called the first antenna and the first connection port.

In brief, the signal-repeating device and signal-repeating method according to the embodiments of the instant disclosure, facilitates the possibility for the communication-monitoring module 24 and the repeating circuit 23 to share the first antenna 21 and/or the second antenna 22, thereby extending the control area of the second frequency band. Accordingly, maintenance engineers or users do not need to stay in a close range to the repeater hardware for inspecting the repeater's operating statuses or control its operation settings. Therefore, the conveniences of installing and maintaining the repeater are effectively increased, as well as increasing the safety of maintenance engineers and omitting the complexity of applying for visiting a restrict location.

What is claimed is:

1. A signal-repeating device for extending a control area, comprising:
    a first connection port, coupled to a first antenna, the first antenna supporting a first frequency band and a second frequency band, wherein the first frequency band and the second frequency band are non-overlapping with each other;
    a second connection port, coupled to a second antenna;
    a repeating circuit, coupled between the first connection port and the second connection port, repeating signals between a base station and a mobile station via the first antenna and the second antenna through the first frequency band;
    a communication-monitoring module, transmitting a status signal to a user terminal via the first antenna through the second frequency band or receiving a second signal from the user terminal via the first antenna through the second frequency band and outputting a control signal according to the second signal; and
    a processing unit, coupled to the repeating circuit and the communication-monitoring module, and modifying configuration or signal quality of the signal-repeating device according to the control signal.

2. The signal-repeating device of claim 1, wherein the repeating circuit and the communication-monitoring module is coupled to the first connection port by circuit layout.

3. The signal-repeating device of claim 1 further comprising:
    a duplex circuit, coupled to the first connection port, the communication-monitoring module and the repeating circuit.

4. The signal-repeating device of claim 1, wherein the repeating circuit comprises:
    an uplink repeating circuit;
    a downlink repeating circuit; and
    a multiplexer, coupled to the uplink repeating circuit, the downlink repeating circuit, the communication-monitoring module and the first connection port.

5. The signal-repeating device of claim 1, wherein the second antenna supports the second frequency band, and the signal-repeating device further comprises:
    a switch module coupled to the first connection port, the second connection port and the communication-monitoring module, the switch module coupling the communication-monitoring module to one of the first antenna and the second antenna.

6. The signal-repeating device of claim 1, wherein the first connection port is connected to the base station via the first antenna through the first frequency band, and the second connection port is connected to the mobile station via the second antenna.

7. The signal-repeating device of claim 1, wherein the first connection port is connected to the mobile station via the first antenna, and the second connection port is connected to the base station via the second antenna through first frequency band.

8. The signal-repeating device of claim 1, wherein the communication-monitoring module is a Bluetooth module or a Wi-Fi module.

9. A signal-repeating method for extending a control area, comprising:
receiving a first signal from a base station or a mobile station via a first antenna of a signal-repeating device through a first frequency band;
sending the first signal to a repeating circuit of the signal-repeating device;
repeating the first signal to the mobile station by the repeating circuit via a second antenna of the signal-repeating device through the first frequency band when the first signal is sent from the base station, or repeating the first signal to the base station by the repeating circuit via the second antenna of the signal-repeating device through the first frequency band when the first signal is sent from the mobile station;
receiving a second signal from a user terminal via the first antenna through a second frequency band, wherein the first frequency band and the second frequency band are non-overlapping with each other;
sending the second signal to a communication-monitoring module of the signal-repeating device;
outputting a control signal by the communication-monitoring module according to the second signal; and
modifying configuration or signal quality of the signal-repeating device by a processing unit according to the control signal.

10. The signal-repeating method of claim 9, wherein the communication-monitoring module is a Bluetooth module or a Wi-Fi module.

11. The signal-repeating method of claim 9, wherein the first antenna is connected to the mobile station through the first frequency band, and the second antenna is connected to the base station.

12. The signal-repeating method of claim 9, wherein the first antenna is connected to the base station, and the second antenna is connected to the mobile station through the first frequency band.

13. The signal-repeating method of claim 9, further comprising:
receiving another first signal from the base station or the mobile station via the second antenna through the first frequency band;
sending the another first signal to the repeating circuit;
repeating the another first signal to the mobile station by the repeating circuit via the first antenna;
receiving another second signal from the user terminal via the second antenna through the second frequency band;
sending the another second signal to the communication-monitoring module;
producing another control signal by the communication-monitoring module according to the another second signal; and
modifying the configuration or the signal quality of the signal-repeating device by the processing unit according to the another control signal.

14. The signal-repeating method of claim 13, wherein the communication-monitoring module is a Bluetooth module or a Wi-Fi module.

15. The signal-repeating method of claim 13, wherein the first antenna is connected to the mobile station through the first frequency band, and the second antenna is connected to the base station.

16. The signal-repeating method of claim 13, wherein the first antenna is connected to the base station, and the second antenna is connected to the mobile station through the first frequency band.

17. A signal-repeating method for extending a control area, comprising:
repeating a first signal between a base station and a mobile station via a first antenna and a second antenna of a signal-repeating device through a first frequency band by a repeating circuit;
receiving a second signal from a user terminal via the first antenna through a second frequency band by a communication-monitoring module of the signal-repeating device, wherein the first frequency band and the second frequency band are non-overlapping with each other;
outputting a control signal by the communication-monitoring module according to the second signal; and
modifying configuration or signal quality of the signal-repeating device by a processing unit of the signal-repeating device according to the control signal.

18. The signal-repeating method of claim 17, wherein the communication-monitoring module is a Bluetooth module or a Wi-Fi module.

19. The signal-repeating method of claim 17, wherein the first antenna is connected the mobile station through the first frequency band, and the second antenna is connected to the base station.

20. The signal-repeating method of claim 17, wherein the first antenna is connected to the base station, and the second antenna is connected to the mobile station through the first frequency band.

* * * * *